United States Patent [19]
Solop

[11] 3,984,508
[45] Oct. 5, 1976

[54] METHOD OF CONTROLLING AN EXTRUDATE WITH A DECKLE BAR HAVING HEATING AND COOLING MEANS

[75] Inventor: Eli Solop, Morris Plains, N.J.

[73] Assignee: Phillips Petroleum Company, Bartlesville, Okla.

[22] Filed: Aug. 23, 1974

[21] Appl. No.: 500,179

Related U.S. Application Data

[62] Division of Ser. No. 290,503, Sept. 20, 1972, Pat. No. 3,840,318.

[52] U.S. Cl. .......................... 264/40.1; 264/176 R; 264/327; 425/378 R; 425/466
[51] Int. Cl.² ........................................ B29D 7/02
[58] Field of Search ............ 264/169, 167, 166, 40, 264/176 R, 177 R, 327; 425/378, 466

[56] References Cited
UNITED STATES PATENTS

| | | |
|---|---|---|
| 2,364,435 | 12/1944 | Foster et al. .................. 425/378 |
| 2,468,585 | 4/1949 | Bluma ........................... 264/177 R |
| 2,572,677 | 10/1951 | Tench ............................... 425/378 |
| 3,320,634 | 5/1967 | Ryan et al. ....................... 425/466 |
| 3,507,939 | 4/1970 | Williams et al. ............ 264/177 R |
| 3,769,379 | 10/1973 | Hinrichs ........................... 264/169 |

*Primary Examiner* — Robert F. White
*Assistant Examiner* — T. E. Balhoff

[57] ABSTRACT

A method for controlling the extrudate emerging from an extruder is provided by sealing a portion of the extrusion die opening with a deckle bar into which is incorporated means for affecting the temperature at the surface of the deckle bar. The embodiments of this invention provide deckle bars into which are incorporated means for heating, cooling and heating and cooling in combination.

7 Claims, 4 Drawing Figures

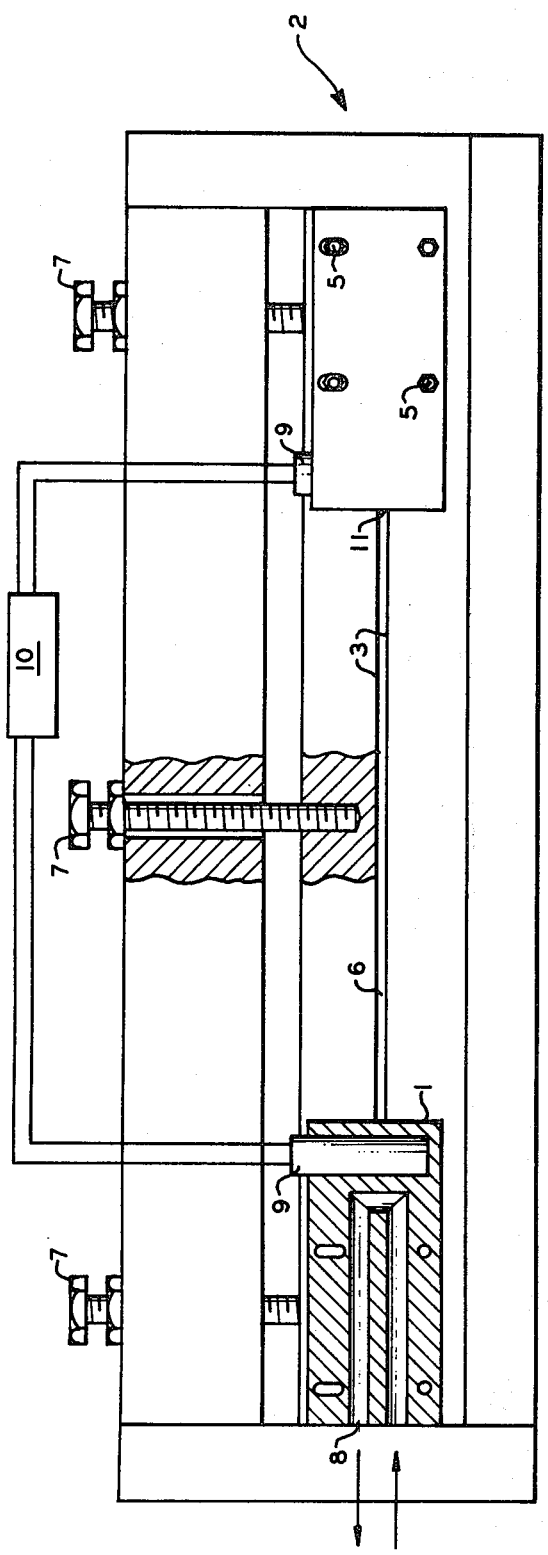
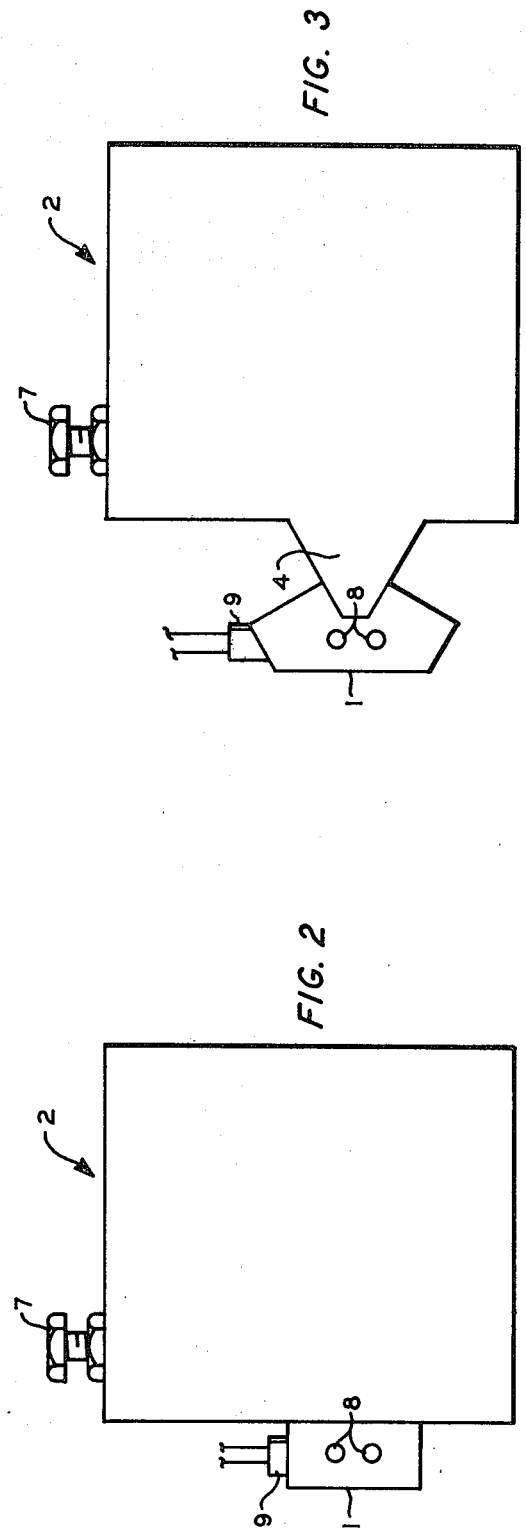
FIG. 1
FIG. 2
FIG. 3

3,984,508

METHOD OF CONTROLLING AN EXTRUDATE WITH A DECKLE BAR HAVING HEATING AND COOLING MEANS

BACKGROUND OF THE INVENTION

This is a divisional application of copending application Ser. No. 290,503 filed Sept. 20, 1972, now U.S. Pat. No. 3,840,318.

This invention relates to the extrusion of plastic materials. In one of its aspects, this invention relates to the regulation of the size of extrudates issuing from extrusion dies. In another of its aspects, this invention relates to deckle bars. In one concept of the invention it relates to the use of deckle bars for controlling the shape of plastic material issuing from an extrusion die.

In the extrusion of flat sheet and film, a great variety of widths of extrudate are manufactured. Since it would be too costly to purchase an extrusion die for each width required or to use one width of die and trim the extruded material to the desired width, the industry practice has been to purchase one die and adjust the die gap length by sealing off, or deckling, the die to the width required. Deckling is generally accomplished by bolting a sealing bar, called a deckle bar, to the front of the die at the die lips and sealing off that part of the die gap length not needed.

Up to this time the use of a deckle bar has caused problems in that the molten plastic extruding from the die scrubs across the edge of the deckle and generally has a wavy appearance resulting in an edge that requires trimming or results in a non-uniform mill roll of material. Additionally, the sweep of molten plastic diverted from the die to the opening left by the deckle bar creates an area of stagnant melt in the die behind the deckle which heat from the body of the die causes to degrade. This degraded plastic is eventually picked up in the melt stream and contaminates the melt stream.

I have discovered that the incorporation into the deckle bar of means for affecting the temperature at the surface of the deckle bar can alleviate the problems stated above.

It is therefore an object of this invention to provide a deckle bar incorporating heat exchange means. It is another object of this invention to provide a method for controlling the extrudate emerging from an extruder. It is still another object of this invention to provide an extrusion die equipped with a deckle bar that will produce extrudate of uniform appearance. It is another object of this invention to prevent the degradation of molten plastic stagnated behind the deckle in an extrusion die.

Other aspects, objects as well as the several advantages of this invention will be apparent to those skilled in the art upon reading the specification, the drawing, and the appended claims.

SUMMARY OF THE INVENTION

According to this invention, there is provided a deckle bar having incorporated therein a means for affecting the temperature at the surface of the deckle bar. More specifically, these means can be an apparatus for cooling the sealing face of the deckle and an apparatus for supplying heat to the surface of the deckle to which the edge of the extrudate conforms on passing through the opening formed by the deckle. Either apparatus may be incorporated into a deckle bar or both may be incorporated into the same deckle bar.

In one embodiment of the invention, the method for controlling the extrudate emerging from an extruder is provided. In this method a portion of the extrusion die opening of an extruder is sealed with a deckle bar which has incorporated therein a means for affecting the temperature at its surface as described above.

In still another embodiment of the invention an extrusion die in combination with the deckle bar as described above is used for the production of extrudates of uniform appearance which are not contaminated with degraded plastic which has developed from stagnant melt collected in the die behind the deckle.

DESCRIPTION OF THE DRAWING

FIG. 1 shows a front view with cut-away of an extrusion die with a deckle bar of this invention having incorporated both cooling and heating means.

FIG. 2 shows the deckle bar of this invention attached to the flush die lips of an extruder.

FIG. 3 shows the deckle bar of this invention attached to extended die lips of an extrusion apparatus.

Referring now to FIGS. 2 and 3, it can be seen that the deckle bar 1 of this invention can be attached to a die 2 having either flush die lips 3 (FIG. 2) or extended die lips 4 (FIG. 3). A typical mounting of the apparatus of this invention can be best seen in FIG. 1. Here the deckle bar 1 is shown attached by cap screws 5 to the die lips 3 of an extrusion die 2. The die gap 6 between the die lips 3 is adjusted by the die lip adjusting bolt 7 to give the desired thickness of extrudate. The width of the extrudate is controlled by adjusting the position of the deckle bars 1 to give the desired width of opening to emit extrudate.

Figure 4:
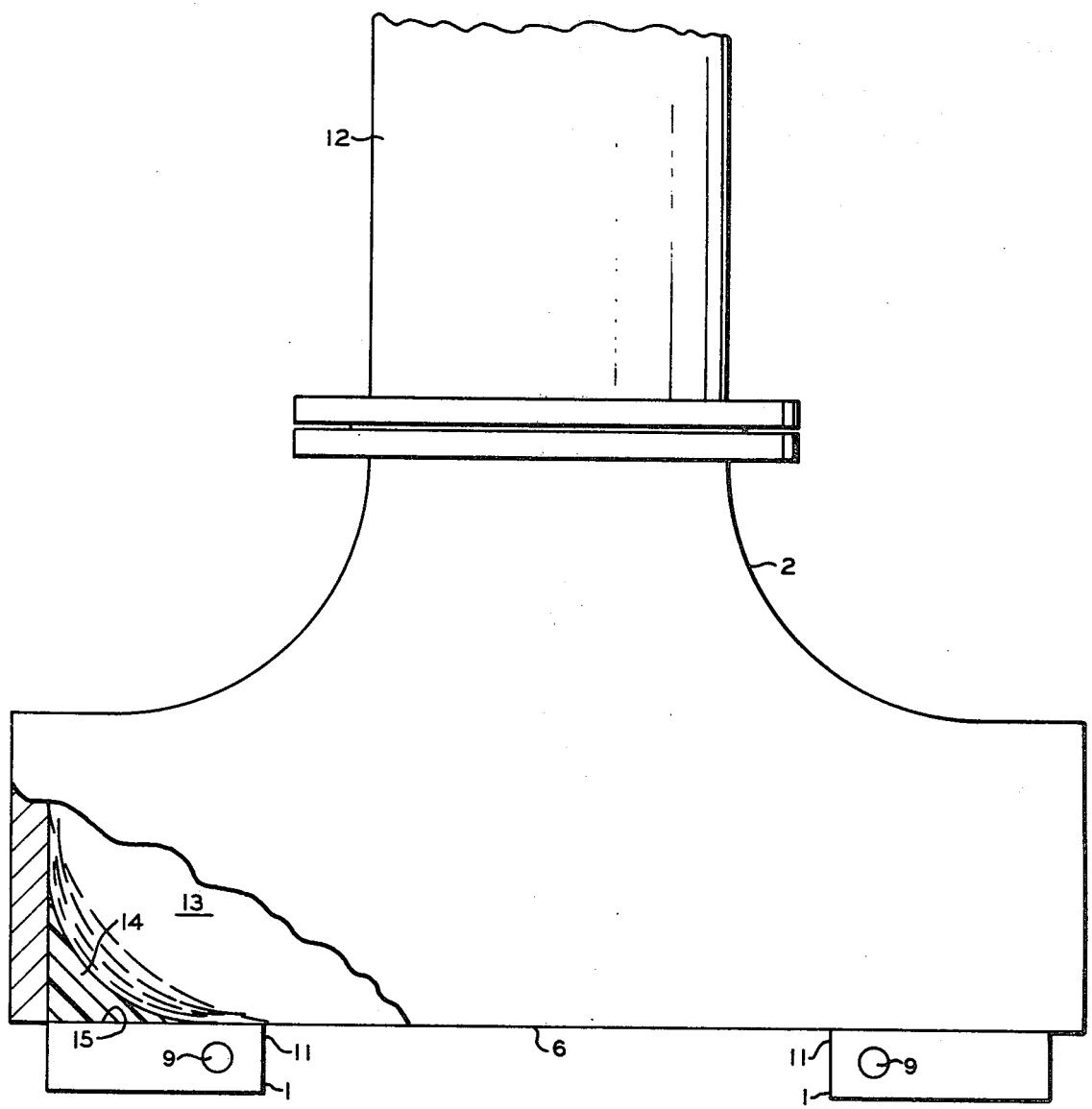
FIG. 4 shows a plan view with cut-away of a deckle bar of this invention attached to an extrusion die.

This invention incorporates into the deckle bar a means for controlling the surface temperature of the deckle bar in specific areas of the deckle. In the cutaway portion of FIG. 1 are shown channels 8 through which cooling fluid can be circulated to reduce the temperature of the sealing surface of the deckle bar particularly in the area in which it is in contact with plastic material at the die gap 6. Also shown is an electrical cartridge heater 9 which is connected to an electrical source 10 to provide heat to the surface of the deckle in that area of contact between the deckle and the extrudate in which the edge of the extrudate is formed by passing against the deckle surface 11.

The actual operation of the method of this invention can best be seen referring to FIG. 4. Until this time using a deckle bar in the extrusion of sheet extrudate, molten plastic from inlet line 12 passes into the extrusion die 2 where it spreads to fill the flattened cavity 13 held back by the deckle bar 1 and the narrowness of the die gap 6. As the molten material passes through the die gap 6 the extrudate is formed by the size of the opening delineated by the die gap 6 and the edges of the deckle bars 11. Because the edges of the deckle bar are cool relative to the plastic the plastic tends to freeze and stick to the deckle bar producing an uneven flow at the lateral edges of the extrudate. Also, as the molten plastic sweeps through the cavity 13 an area of stagnation forms in the area 14 at the juncture of the deckle bar and die. This stagnated material is subjected to heat for an excessive length of time causing it to degrade befoe it is swept along by the molten stream to become extruded material.

In operation by the method of this invention the surface of the deckle 11 is heated, as shown here by a cartridge heater 9, so that extrudate does not tend to stick on the surface 11. Also, by the method of this invention the surface 15 of the deckle bar 1 is kept sufficiently cool to prevent degradation of stagnated material in the area 14 and can be kept sufficiently cool to cause deposition of plastic material at surface 15 which can build up to form a deposit which will prevent transfer of enough heat to stagnated material to cause degradation of this material.

Means, well known in the art, can be used to measure the temperature in the deckle bar near the surface where it is desired that a certain temperature be effected. This temperature can be reduced to a signal and relayed to a means that will adjust the input of heat transfer material so that temperature can be controlled at the surface as desired.

Although circulation of a cooling fluid has been illustrated as a best mode for cooling the surface of the deckle bar it is to be understood that any convenient method for carrying out the cooling is contemplated by this invention. Similarly, although a cartridge heater is illustrated as a best mode for heating the deckle bar surface, any suitable means of heat transfer is contemplated by the method of this invention.

The invention will find use mainly in the extrusion of thermoplastic materials. It can be seen, however, that the extrusion of any material such as glass or metals, where the use of the deckle bar is appropriate can be benefitted by the invention.

Reasonable variation and modification are possible within the scope of the foregoing disclosure, the drawing and the appended claims of the invention, the essence of which is that there is provided a method and apparatus for controlling the extrudate emerging from an extruder and transferring heat to and from portions of a deckle bar in contact with extrudate emerging from an extrusion die.

I claim:
1. A method for controlling the extrudate emerging from an extruder comprising sealing a portion of the extrusion die opening with a deckle bar and affecting the temperature at the surface of the deckle bar by:
  a. cooling the sealing face of the deckle, said cooling sufficient to control deposition of extrudate at the sealing face behind the deckle thereby retarding heat degradation of extrudate flowing through said extruder, and
  b. supplying heat to the surface of the deckle to which the edge of the extrudate conforms on passing thereby, said heat sufficient to prevent freezing of extrudate on said surface.
2. The method of claim 1 wherein both the degree of cooling of the cooled surface is controlled and the degree of heating of the heated surface is controlled.
3. The method of claim 1 wherein degree of cooling of the means for cooling is controlled.
4. The method of claim 1 wherein the heat supplied by the means for supplying heat is controlled.
5. The method of claim 3 wherein cooling comprises the method of circulating cooling fluid through a cooler.
6. The method of claim 4 wherein the heating comprises using an electrical cartridge heater.
7. The method of claim 2 wherein the cooling comprises the method of circulating cooling fluid through a cooler and the heating comprises using an electrical cartridge heater.

* * * * *